United States Patent Office 2,798,887
Patented July 9, 1957

2,798,887

PREPARATION OF MONOMERIC ACRYLAMIDE

Norbert M. Bikales, Stamford, Conn., assignor to American Cyanamid Company, New York, N. Y., a corporation of Maine No Drawing. Application July 29, 1955,
Serial No. 525,393

9 Claims. (Cl. 260—561)

This invention relates to the preparation of acrylamide. More particularly, it relates to the isolation of acrylamide from acrylamide sulfate.

Acrylamide and its polymerization and copolymerization products have become of increasing importance, particularly in the fields of adhesives, dispersants, fibers, plasticizers, surface coatings, thickening agents, as well as in the leather, paper, rubber, textile and photographic arts. Because of these many potential applications, there has been a decided increased interest in improved processes for producing monomeric acrylamide.

One method of preparing acrylamide comprises reacting acrylonitrile with sulfuric acid and water, usually in the presence of a polymerization inhibitor. The resultant reaction mass is then treated to isolate the free amide. Because acrylamide is exceedingly soluble in water, about 200 grams/100 grams of water at 30° C., it cannot be isolated by the simple addition of the reaction mass to water. Various procedures, therefore, have been suggested for isolating water-soluble acrylamide from acrylamide sulfate.

One such procedure comprises treating an aqueous acrylamide sulfate solution with lime to produce water-insoluble calcium sulfate. After separation of the insoluble sulfate, the aqueous acrylamide solution may be concentrated and cooled to crystallize acrylamide, which may then be separated by conventional means. This procedure, however, is subject to certain disadvantages. For example, because of the physical nature of calcium sulfate, acrylamide is retained thereby when it is separated from solution. To minimize acrylamide lost in this manner, it is customary to work with dilute solutions and to repeatedly wash the separated cake. The result is that much time and effort must be spent in concentrating to recover acrylamide.

Another procedure for isolating acrylamide comprises neutralizing in a selective solvent such as methanol, isopropyl alcohol or the like, using as the neutralizing agent ammonia or another base which forms a water-soluble sulfate such as an alkali metal hydroxide or carbonate. The resultant sulfate is insoluble in the solvent and can be readily separated. This procedure, however, in requiring a non-aqueous organic solvent involves high costs as well as toxicity, flammability, and recovery problems.

More recently there has been proposed a recovery procedure which comprises reacting acrylamide sulfate with ammonia and water to produce at a temperature greater than about 20° C. a single aqueous phase substantially saturated with acrylamide. The solubility of ammonium sulfate in a saturated or near saturated acrylamide solution being quite low at elevated temperatures, resultant ammonium sulfate is thrown out as a crystalline solid. Precipitated ammonium sulfate is then separated and residual liquor cooled to precipitate acrylamide.

This procedure produces a high purity acrylamide product without involving any of the disadvantages of previous procedures. It has the drawback, however, that neutralization must be conducted under carefully controlled hydrogen ion concentrations. It has been found that if the pH is permitted to rise above about 7, acrylamide begins to be converted in objectionable quantities to $\beta,\beta',\beta''$-nitrilotripropionamide. For example, when operating at a pH of 8, a temperature of about 50° C. and a high monomer concentration, i. e. 65%, about 2% of the acrylamide is converted per hour. At lower concentrations of acrylamide, the rate of this side reaction is considerably faster. Accordingly, it is quite essential that the pH during neutralization be maintained below about 7 and preferably below 6.5. Only by careful pH control, therefore, is it possible to avoid the formation of this undesirable by-product.

It is the primary object of this invention to provide a method for isolating acrylamide from acrylamide sulfate which is not subject to this disadvantage of the above-described ammonia neutralization process. It is a further object of this invention to provide a process which, at the same time, retains the many advantages of said ammonia neutralization process. Particularly, it is an object of this invention to improve on the above described ammonia neutralization process so that objectionable by-product formation of nitrilotripropionamide is avoided and close operational pH control rendered unnecessary.

In accordance with this invention, these objects have been met in a simple yet effective manner. It has now been found that the solubilities of the sulfates of alkali metals in concentrated aqueous acrylamide solutions are low at room temperature and becomes less with increasing temperatures. This is surprising since the solubilities of the alkali metal sulfates in water are high and remain substantially the same or increase considerably with increasing temperature. The solubility of acrylamide, on the other hand, increases with temperature in a saturated aqueous alkali metal sulfate solution as it does in water.

In accordance with the process of this invention, therefore, acrylamide sulfate may be neutralized in an aqueous medium using an alkali metal hydroxide or carbonate to give a single phase aqueous solution concentrated with acrylamide. The solubilities of the alkali metal sulfates being low in such acrylamide solutions, the resultant sulfate crystallizes and may be separated. Acrylamide may then be crystallized by lowering the temperature. By using an alkali metal hydroxide or carbonate as the neutralizing agent, the advantage is gained that objectionable formation of nitrilotripropionamide is avoided and rigid pH control, necessary when neutralizing with ammonia, need not be observed.

Acrylamide sulfate treated in accordance with the process of this invention may be in any form and may have been derived from any process. It may, for instance, be in the form of substantially pure crystalline acrylamide sulfate. More likely, however, it will be in the form as directly obtained from the particular process for preparing it, such as the reaction product obtained by hydrating acrylonitrile with sulfuric acid and water.

Acrylamide sulfate, in whatever form, is added to water in which it is highly soluble. Preferably, simultaneous addition of the neutralizing agent is also made. The neutralizing agent may be added either as a solid or in the form of an aqueous solution. In either event, as contrasted with the use of ammonia as the neutralizing agent, water of neutralization is formed. The effect of this, when using the neutralizing agent as an aqueous solution, is that the theoretical upper limit of acrylamide concentration in any particular case will not approach saturation at the selected sulfate separation temperature, particularly when it is a high temperature, because of the presence in the system of the water of neutralization and the water added with the neutralizing agent. The amount of acrylamide sulfate treated, therefore, will be such as to provide, after it is substantially neutralized, a single aqueous phase having an acrylamide concentration approaching the maximum possible in view of the formation of water of neutralization. The amount of neutralizing agent will be that needed to neutralize the acrylamide sulfate content and provide said acrylamide concentration.

It is a primary advantage of this invention that since objectionable by-product formation of nitrilotripropionamide is avoided, the pH may be permitted to exceed that which must be observed when neutralizing with ammonia. Nevertheless, in order to obtain optimum recovery of acrylamide, upper and lower pH limits should be observed, since acrylamide hydrolyzes in both strongly acidic and basic media. The hydrogen ion concentration, therefore, should be maintained at that equivalent to a pH of about 2–11 and preferably from about 3.5–10.

Above about 15° C. the solubilities of alkali metal sulfates are exceedingly small in concentrated aqueous acrylamide solutions. Accordingly, it is possible to obtain an excellent separation of sulfate. As a result, any mother liquor adhering to separated acrylamide crystals formed on cooling of the residual solution is so nearly free of alkali metal sulfate as to make the acrylamide directly useful in many applications without being subjected to further purification. While alkali metal sulfate separation may be practiced on concentrated acrylamide solutions at temperatures higher than about 60° C., any additional decrease in the solubilities of the alkali metal sulfates is so small as to make operating at these higher temperatures of no advantage. Similarly, the process may be operated on concentrated acrylamide solutions at temperatures less than about 15° C. However, at these lower temperatures, the solubilities of the alkali metal sulfates in concentrated acrylamide solutions are relatively high while that of acrylamide in a saturated alkali metal sulfate solution is low. Moreover, the rate of decrease in solubility of acrylamide with decrease in temperature is small. Operating at lower temperatures, therefore, unduly restricts the initial acrylamide concentration and results in a small recovery of acrylamide crystals which, moreover, will have adhered thereto mother liquor relatively high in alkali metal sulfate concentration. The preferred operating temperature, therefore, is from about 15° C.–60° C.

As pointed out above, alkali metal hydroxides and carbonates used in the neutralization process of this invention form water of neutralization. The amount of water in the system, moreover, is further increased when the neutralization agent is employed as an aqueous solution. The upper theoretical limit of acrylamide concentration in the latter instance, therefore, usually will not approach saturation for any selected sulfate separation temperature within the preferred range of 15° C.–60° C. It may be desirable, therefore, in order to obtain optimum crystallization of acrylamide and to insure optimum precipitation of sulfate, to concentrate the neutralized solution so as to approach acrylamide saturation at the selected temperature. This may be conducted either prior to or after separation of alkali metal sulfate precipitated during neutralization and by any means desired. Upon completion of precipitation, any additionally precipitated alkali metal sulfate can be separated. Because the solubilities of alkali metal sulfates in concentrated acrylamide solutions are so low, saturating the solution with respect to acrylamide will usually produce only traces of additional sulfate precipitation. It is an added advantage of the process of this invention over the use of ammonia as the neutralizing agent that substantially optimum separation of sulfate may usually be obtained without saturating the solution with respect to acrylamide.

Physical separation of crystalline alkali metal sulfate from the aqueous acrylamide solution may be accomplished in any conventional manner, such as by filtration, centrifuging, or the like. The solids so obtained may then be washed with water or an aqueous solution of alkali metal sulfate to recover any acrylamide. Aqueous wash liquor so obtained may be recycled.

After concentration of the neutralized solution, if practiced, and separation of crystalline alkali metal sulfate, residual solution is cooled to precipitate acrylamide. Cooling is conducted to the extent desired, it being limited only by the fact that the aqueous liquid phase be maintained. Inasmuch as the solubilities of alkali metal sulfates increase as the temperature is decreased, there will be little, if any, precipitation of the alkali metal sulfate remaining in solution after sulfate separation. The resultant acrylamide crystals precipitated by cooling are substantially pure acrylamide. The precipitate may be separated by conventional means, and dried.

The process of this invention has been described to this point with the recovery of acrylamide as a solid. While this is the usual form in which the product is recovered, it may, and oftentimes will be recovered as a concentrated aqueous acrylamide solution. Such a solution may be obtained by diluting with water the aqueous acrylamide solution remaining after separation of alkali metal sulfate. Dilution is generally carried out to provide an aqueous product having an acrylamide concentration of some 10–30%. This solution may then be employed without further purification as desired, such as, for instance, in the preparation of polymers.

While the process of this invention may be conducted batchwise, it is most advantageously practiced on a continuous basis. When operating continuously, alkali metal sulfate is recovered from the concentrated aqueous acrylamide slurry in any manner, such as centrifuging or filtration, the cake washed, and washings recycled. The aqueous acrylamide solution is then concentrated, if desired, and cooled to precipitate acrylamide which is separated in a conventional manner. Residual solution is then recycled along with the washings.

The following examples will further describe the invention. These examples are illustrative only and not by way of limitation. Unless otherwise noted, all parts are by weight.

Example 1

To 100 parts of water at 50° C. is added, simultaneously and with good agitation, gaseous ammonia and acrylamide sulfate. The rate of the addition is such that the pH stays between 7.8 and 8.2, corresponding to the addition of 0.3 mol of acrylamide per hour. After 68 parts of acrylamide sulfate and 14 parts of ammonia are used, the formation of a white, crystalline precipitate is noted. Upon cooling, the precipitate is filtered and dried. The separated solid melts at 181° C.–185° C. Comparison of infrared spectra and a mixed melting point with an authentic sample reveals the solid to be $\beta,\beta',\beta''$-nitrilotripropionamide, indicating a large loss of acrylamide in the side-reaction.

Example 2

To 100 parts of water is simultaneously added at 50° C., and over a period of 55 minutes, 332 parts of crude acrylamide sulfate (containing 264 parts of acrylamide sulfate) and 367 parts of a 55% aqueous solution of sodium hydroxide, at rates so as to maintain the pH at 7–10. The resulting slurry is centrifuged to separate 228 parts of sodium sulfate. To 100 parts of the filtrate containing 26% acrylamide is added at 45° C. over a period of two hours 231 parts of a reaction mixture of acrylonitrile and concentrated sulfuric acid containing 186 parts of acrylamide sulfate simultaneously with 174 parts of a 55% aqueous solution of sodium hydroxide at such rates that the pH of the slurry is maintained from 7–10. The slurry is centrifuged at a temperature of 40° C. to remove 214 parts of sodium sulfate. 210 parts of the filtrate containing 35% acrylamide is again used as reaction medium to which is simultaneously added 560 parts of crude acrylamide sulfate (containing 450 parts of acrylamide sulfate)

and 480 parts of a 55% aqueous solution of sodium hydroxide at a temperature of 45° C. and at such rates as to maintain the pH from 7–10. The slurry is centrifuged at 40° C. to remove 383 parts of sodium sulfate. 500 parts of the filtrate containing 37% acrylamide is then concentrated in vacuo at 55° C. to 270 parts, filtered to remove the additional trace of precipitated sodium sulfate, chilled to 5° C. and centrifuged to separate 101 parts of crystalline acrylamide analyzing 97+% acrylamide. 148 parts of mother liquor containing 60 parts of acrylamide is suitable either for direct use in polymer preparation or as reaction medium for further neutralization of acrylamide sulfate. No evidence of $\beta,\beta',\beta''$-nitrilotripropionamide is encountered in any of the crystalline acrylamide, the mother liquor or the sodium sulfate.

Example 3

To 350 parts of water is added simultaneously and with good agitation 687 parts of crude acrylamide sulfate and 524 parts of anhydrous potassium carbonate over a period of two hours at 45° C.–55° C. and at such rates that the pH is maintained between 2–10. The slurry is centrifuged hot to remove 677 parts of potassium sulfate. 595 parts of filtrate containing 41% acrylamide is vacuum concentrated at 40° C. to 374 parts with additional precipitation of 3 parts of potassium sulfate. The concentrated filtrate is then chilled to 0° C. and centrifuged to separate 152 parts of crystalline acrylamide analyzing 98+% pure. There is no evidence of $\beta,\beta',\beta''$-nitrilotripropionamide in the crystalline acrylamide, the mother liquor or the potassium sulfate.

I claim:

1. A process for recovering monomeric acrylamide from acrylamide sulfate which comprises: reacting acrylamide sulfate in an aqueous medium with a neutralizing agent selected from the group consisting of alkali metal hydroxides and carbonates, thereby forming an aqueous slurry comprising dissolved acrylamide and crystalline alkali metal sulfate; the amount of neutralizing agent being such as to neutralize substantially the entire sulfuric acid content of said acrylamide sulfate, and the amount of acrylamide sulfate being such as to provide after neutralization a single aqueous phase concentrated with acrylamide at a temperature of at least 15° C.; maintaining the pH during neutralization at about 2–11; and separating precipitated alkali metal sulfate at a temperature of at least 15° C.

2. A process according to claim 1 in which the residual solution is cooled to precipitate acrylamide.

3. A process according to claim 2 in which the neutralizing agent is in the form of an aqueous solution and the neutralized solution is adjusted to near saturation with acrylamide at a temperature of 15° C.–60° C. prior to cooling.

4. A process according to claim 1 in which the pH is from about 3.5–10.

5. A process according to claim 1 in which the neutralizing agent is sodium hydroxide.

6. A process according to claim 1 in which the neutralizing agent is sodium carbonate.

7. A process according to claim 1 in which the neutralizing agent is potassium hydroxide.

8. A process according to claim 1 in which the neutralizing agent is potassium carbonate.

9. A process for recovering monomeric acrylamide from acrylamide sulfate which comprises: reacting acrylamide sulfate in an aqueous medium with an aqueous solution of a neutralizing agent selected from the group consisting of alkali metal hydroxides and carbonates, thereby forming an aqueous slurry comprising dissolved acrylamide and crystalline alkali metal sulfate; the amount of neutralizing agent being such as to neutralize substantially the entire sulfuric acid content of said acrylamide sulfate, and the amount of said acrylamide sulfate being such as to provide after neutralization a solution concentrated with acrylamide; maintaining the pH during neutralization at about 3.5–10; separating precipitated alkali metal sulfate; concentrating residual solution to near saturation with acrylamide at a temperature of 15° C.–60° C.; separating any additionally precipitated alkali metal sulfate; cooling residual liquor and separating precipitated acrylamide.

References Cited in the file of this patent

UNITED STATES PATENTS

| 2,683,173 | Weisgerber | July 6, 1954 |

FOREIGN PATENTS

| 753,624 | Germany | July 21, 1952 |
| 631,592 | Great Britain | Nov. 7, 1954 |
| 200,363 | Switzerland | Dec. 16, 1938 |